March 29, 1960 J. W. BOZEMAN 2,930,894
OPTICAL SIGHTING AND TRACKING DEVICE
Filed July 13, 1954 6 Sheets-Sheet 1

FIG. 1

INVENTOR.
John W. Bozeman
BY
ATTORNEY

March 29, 1960 J. W. BOZEMAN 2,930,894
OPTICAL SIGHTING AND TRACKING DEVICE
Filed July 13, 1954 6 Sheets-Sheet 2

Fig. 2

INVENTOR.
John W. Bozeman
BY
ATTORNEY

March 29, 1960  J. W. BOZEMAN  2,930,894
OPTICAL SIGHTING AND TRACKING DEVICE
Filed July 13, 1954  6 Sheets-Sheet 4

INVENTOR.
John W. Bozeman
BY
*Charles S. Wilson*
ATTORNEY

March 29, 1960     J. W. BOZEMAN     2,930,894
OPTICAL SIGHTING AND TRACKING DEVICE Filed July 13, 1954     6 Sheets-Sheet 5

INVENTOR.
John W. Bozeman
BY
Charles S. Wilson
ATTORNEY

March 29, 1960 J. W. BOZEMAN 2,930,894
OPTICAL SIGHTING AND TRACKING DEVICE
Filed July 13, 1954 6 Sheets-Sheet 6

FIG. 12

INVENTOR.
John W. Bozeman
BY
ATTORNEY.

United States Patent Office 2,930,894
Patented Mar. 29, 1960

2,930,894

OPTICAL SIGHTING AND TRACKING DEVICE

John W. Bozeman, Baldwin, N.Y., assignor to Republic Aviation Corporation, Farmingdale, N.Y., a corporation of Delaware Application July 13, 1954, Serial No. 443,069

19 Claims. (Cl. 250—203)

This invention relates in general to tracking devices and more particularly has to do with an optical tracking device for tracking and indicating the position of an optically perceptible object.

Among other objects the present invention contemplates an optical tracking device embodying means for optically scanning a field of view about its optical axis, which serves as a tracking line, and to produce signals indicating the position of an optically perceptible object within that field of view with respect to the tracking line.

While the present invention may have general utility, it is particularly adapted for use in the weapon guidance system of an aircraft where it serves to track the course of a guided missile launched from the aircraft and to indicate any errors in the course of the missile between the aircraft and a target.

The present invention also contemplates a combination of the instant tracking device with a sighting means wherein means is provided to prevent the combined unit from being adversely affected by yaw and pitch movements of the aircraft with which it is associated and whereby the aircraft may be flown on preselected courses relative to the target while still maintaining an accurate tracking of the missile.

With the above and other objects in view as will become apparent, this invention consists in the construction, combination and arrangement of parts all as hereinafter more fully described, claimed and illustrated in the accompanying drawings wherein:

One of the weapons guidance systems heretofore proposed for controlling the flight of a missile launched from an aircraft toward a target contemplates the use of a conventional fixed reticle sight mounted in the aircraft to establish a line of sight between the aircraft and the target. An optical tracking device is mounted in the aircraft in close proximity with the sight and with its optical axis in close parallel relationship with the line of sight. Due to this arrangement the parallax error between the line of sight and the optical axis is reduced to a minimum and for all intents and purposes they may be considered to be in coincidence. It is manifest from the foregoing that the maneuvering of the aircraft to align the reticle of the sight with the target thereby establishing the line of sight also aligns the optical axis of the tracking device with the target and that thereafter the optical axis may be utilized as a tracking line or true course between the aircraft and target along which a guided missile may be directed to the target.

The guided missile is provided with a suitable light source, such as a flare, that is illuminated automatically upon the launching of the missile. Moreover, the missile is so positioned on the aircraft that shortly after it is launched it crosses or comes into close relationship with the optical axis or tracking line of the tracking device. The tracking device is constructed and arranged to receive the light rays from the flare and in response thereto to produce error signals indicating the position of the missile with respect to the tracking line. These error signals are fed to a suitable computer that converts them into command signals that are transmitted through radio means to the control or guidance system of the missile where they are effective to direct the flight of the missile so as to bring it into agreement with the tracking line and thus place the missile on the true course toward the target.

The present invention is directed toward an optical tracking device for use in a weapons guidance system such as that above set forth where it serves to produce error signals indicating the missile's position relative to the optical axis or tracking line of the device. To this end, the tracking device contemplated herein embodies means for scanning a field of view about its optical axis or tracking line into which the missile appears shortly after it has been launched from the aircraft and for converting light rays received from a light source carried by the missile into signals indicating the position of the missile relative to the tracking line. To assist in more readily locating the missile, and to assure accurate tracking after it has been located, means are provided whereby the scanned field of view is relatively large at the time the missile is launched and is thereafter narrowed or restricted as a function of time.

It is manifest, that in a weapon guidance system of the type above set forth, movements of the aircraft in pitch and yaw displace the line of sight and the tracking line from the target, thus making it impossible to accurately direct the missile to the target. Hence, the present invention contemplates a combination of the instant tracking device with sighting means to establish the line of sight together with means for stabilizing the line of sight and the tracking line. To this end, the combined sighting and tracking device is provided with means connected to and operated by conventional pitch and yaw gyroscopes for optically rotating the line of sight and the tracking line so that movements of the aircraft in pitch and yaw do not adversely affect the accuracy of the tracking operation of the device.

It is often, if not always, advantageous for the pilot to be able to evasively maneuver the aircraft while the missile is in flight toward the target without adversely interfering with the tracking of the missile. Therefore, the present invention also proposes means under the control of the pilot whereby the yaw and pitch gyroscopes may be selectively precessed to the end that it will be unnecessary for the pilot to maintain the aircraft directed at the target during the flight of the missile. In other words, the pilot may fly the aircraft through constant radius turns to the right or left or at a course to one side or the other of the target.

Figure 1:
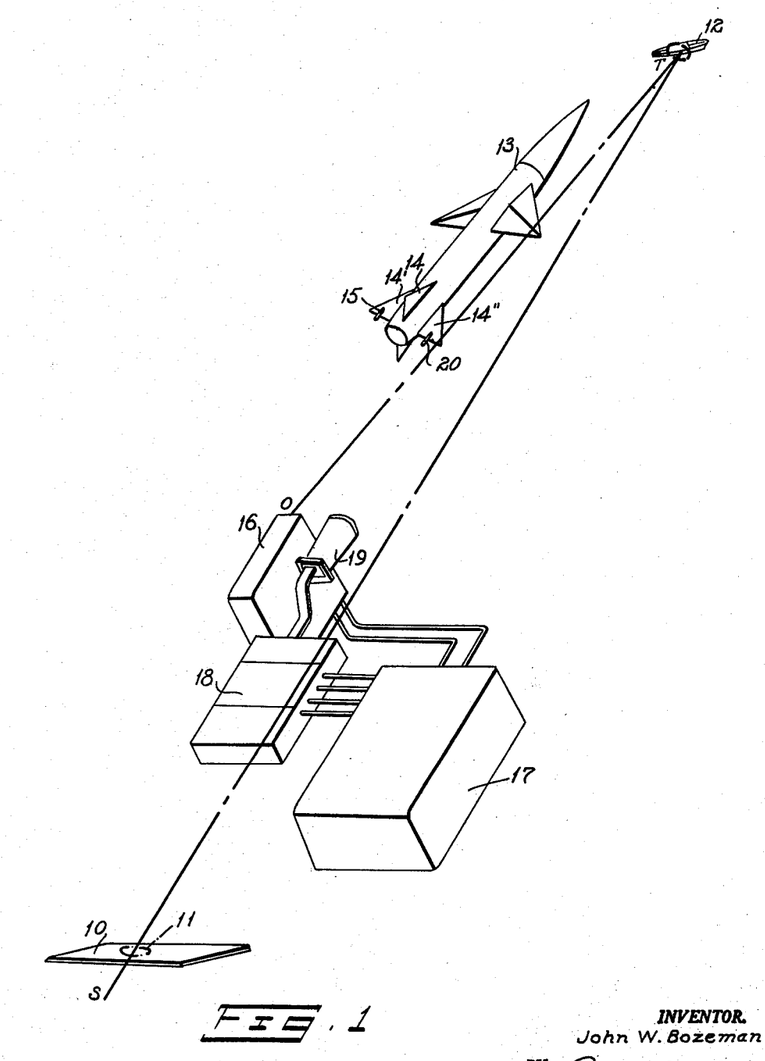
Fig. 1 is a schematic representation of the instant invention in association with the weapon guidance system of an aircraft where it serves to indicate any deviation of a guided missile launched from the aircraft from a tracking line between the aircraft and the target.

Referring to the drawings and in particular to Fig. 1, 10 designates a conventional fixed sight of an aircraft, not shown. A line of sight S—T is established between the reticle 11 of the sight 10 and a distant target 12 by maneuvering the aircraft to properly align the reticle 11 with the target 12.

A missile 13 discharged or launched from the aircraft toward the target 12, is provided at its aft end with a suitable stabilizing fin assembly 14. One stabilizing fin 14' of the assembly 14 carries a suitable light source such as a sodium flare 15 that is ignited automatically upon the firing of the missile 13.

Figure 2:
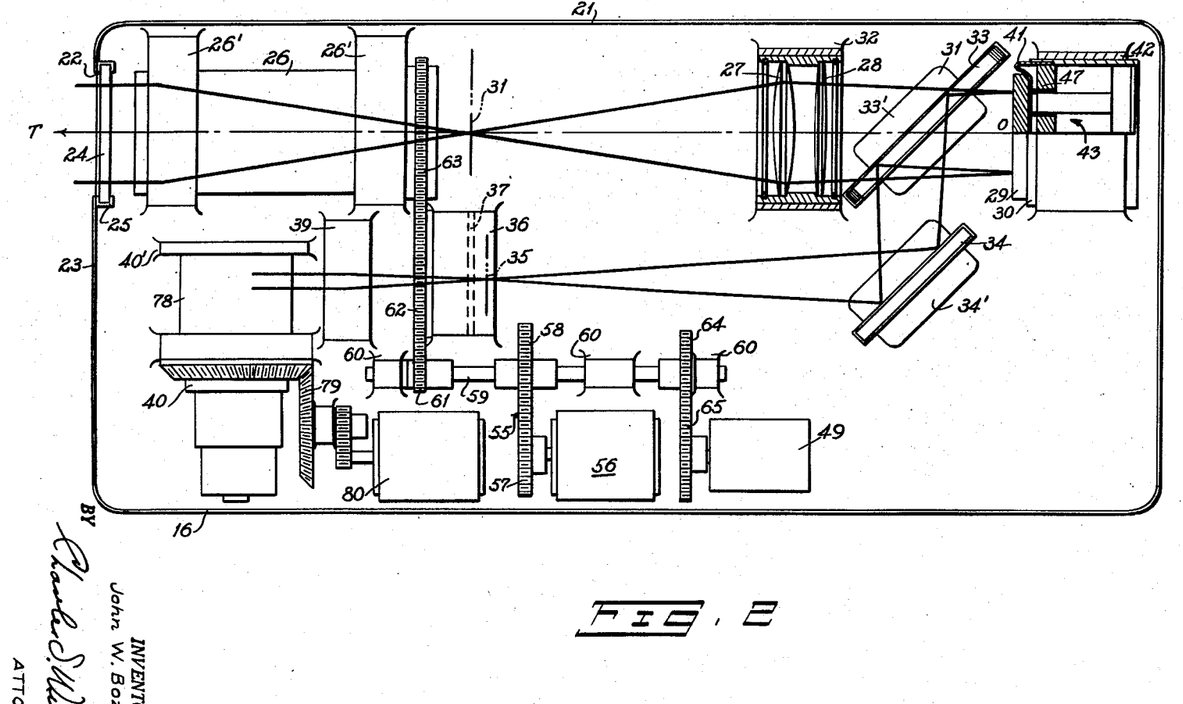
Fig. 2 is a side view of the optical tracking device contemplated herein.

The optical tracking device 16 proposed hereby, is fixedly mounted in the aircraft in close proximity to sight 10 with its optical axis O—T, Fig. 2, substantially parallel to the line of sight S—T established by the sight 10. Due to the close parallel relationship of the line of sight S—T and the optical axis O—T, the parallax error therebetween is reduced to a minimum and for all intents and purposes they may be considered to be coincident. It is manifest, therefore, that by maintaining the line of sight S—T on the target 12, the optical axis O—T of the tracking device 16 is also maintained on the target 12 and may be utilized as a tracking line or true course along which the missile 13 may be directed.

As will hereinafter be more fully set forth, the tracking device 16 scans a field of view about the optical axis or tracking line O—T into which the missile 13 passes shortly after it has been launched from the aircraft. Light rays from the flare or light 15 are received by the tracking device 16 and are converted into electrical signals indicating the direction and magnitude of any displacement of the missile 13 relative to the tracking line O—T. The signals developed by the tracking device 16 are fed to a suitable command computer 17 that converts them into command signals. The output of computer 17 is fed to a transmitter 18 and from its horn antenna 19 to a receiving antenna 20 mounted on the fin 14' of the stabilizing assembly 14 of the missile 13. The command signals received by the antenna 20 are then passed to a suitable guidance or control system, not shown, in the missile 13 where they are operative to control its flight toward the target 12. Since the means for converting and transmitting the signals developed by the tracking device 16 to the missile 13 and the guidance system of the missile 13 are conventional and form no part of the instant invention, they are not set forth in detail.

As shown more particularly in Fig. 2, the tracking device 16 comprises a closed box or casing 21 having an aperture or opening 22 formed through one of its end walls 23. The opening 22 is closed by an optical glass or band pass filter 24 that is held in position by a frame 25 that is suitably secured to the inner side of wall 23. The optical glass 24 serves as a window for the casing 21 to selectively pass light rays from the missile's flare 15 into the casing 21.

Suitably mounted within the casing 21 in optical axial alignment with the filter 24 and with each other to thereby establish the optical axis or tracking line O—T of the tracking device 16, are a variable focal length lens 26, a collimating lens 27, a focusing lens 28 and a mirror 29 mounted on a scanning head 30.

More specifically, the variable focal length lens assembly 26 is mounted in spaced supports 26' and positioned to receive the light rays passing through the filter 24 and to focus them at an image plane 31 disposed on the optical axis O—T. The variable focal length lens 26 is of a conventional type that may be adjusted between a first position or short focal length that provides a wide field of view with low magnification and a second position or long focal length that provides a relatively narrow field of view with high magnification, without moving or changing the position of the image plane. Since variable focal length lenses of this type are well-known and readily obtainable on the market, the details of its construction and operation are neither shown nor described herein.

The collimating lens 27 and focusing lens 28 are mounted one behind the other in a common support 32 so that the former receives the light rays from the variable focal length lens 26. Because of the foregoing arrangement, the collimating lens 27 inverts the image leaving the light rays parallel and at the paraxial angle at which they entered the variable focal length lens 26. From the collimating lens 27 the light rays pass to and through the focusing lens 28 which focuses them at a preselected distance as will hereinafter appear.

The converging light rays from the focusing lens 28 are passed through a half-silvered mirror 33 that is mounted by a support 33' so as to be positioned on the optical axis O—T but at a 45° angle relatively thereto, and to the mirror 29 of the scanning head 30. From the mirror 29, the light rays are directed back along the optical axis O—T to the mirror 33 by which they are reflected 90° from the optical axis O—T to a mirror 34. The mirror 34 is mounted by a support 34' to be disposed parallel to and to receive the light rays reflected by the mirror 33 and to direct them to a focus point 35 lying a short distance in front of a conventional iris diaphragm assembly 36 suitably mounted within the casing 21. The focusing lens 28 serves to focus the light rays so that they appear in the form of a small disc of light on the variable aperture diaphragm or shutter 37 of the assembly 36 after they have been reflected by the mirrors 29, 33 and 34.

As will hereinafter be more fully explained, the diaphragm or shutter 37 is adjustable to vary the size of its aperture 38 between a first size where it is relatively large and a second position where it is relatively small. In any instance, however, the light rays passing through the aperture 38 are received by a collector lens 39 that is mounted within the casing 21 on a suitable base 39'. From the collector lens 39, the light rays pass to a photoelectric cell assembly 40, mounted in the casing 21 by a supporting frame 40', where the light rays are converted by the photo-electric cell assembly 40 into a current.

To provide means whereby selected fields of view are scanned about the optical axis or tracking line O—T, the mirror 29 is mounted on a resilient or spring diaphragm 41, which in turn is suitably secured to the casing 42 of the scanning head 30. The mirror 29 is actuated to rotate about its horizontal axis against the action of the spring 41 by a pair of coils 43 and 44 that are mounted within the casing 42 and disposed at the opposite ends of the vertical axis of the mirror 29 and about its vertical axis by a second pair of coils 45 and 46 that are mounted within the casing 42 at the opposite ends of the horizontal axis of the mirror 29. The coils 43, 44, 45 and 46 are positioned in a magnetic field produced by a permanent magnet 47 that is mounted within the casing 42 and are series connected to a source of electrical energy in such a manner that opposite pairs of coils operate concurrently but in opposite directions. Thus, when the horizontal pair of coils 45 and 46 are energized, the mirror 29 tilts about its vertical axis against the spring diaphragm 41 to cause a proportionately angular displacement in azimuth of the reflected paraxial light rays of twice the mirror angle. Similarly, when the vertical pair of coils 43 and 44 are energized the mirror 29 tilts about its horizontal axis against the spring diaphragm 41 to cause a proportionate displacement in elevation of the reflected paraxial light rays.

Figure 3:
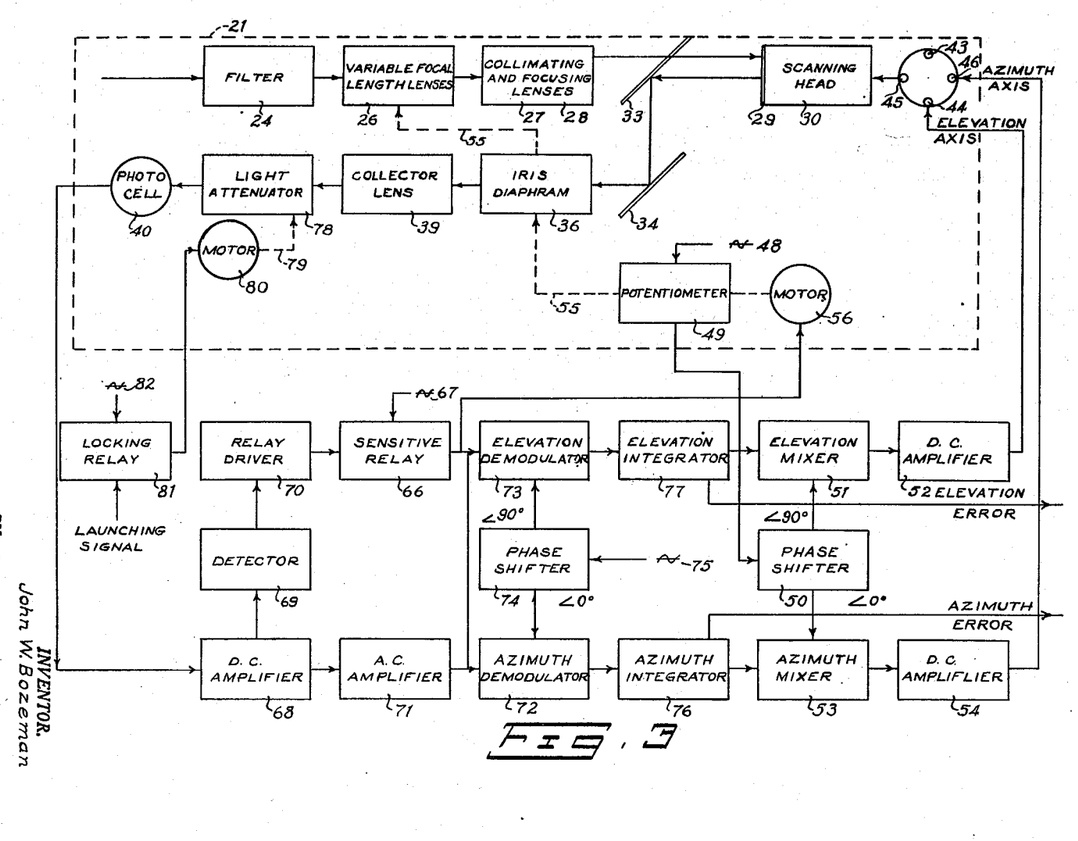
Fig. 3 is a block diagram showing the operation of the optical tracking device contemplated herein.

The coils 43 and 44 are connected to an alternating current source 48 through a potentiometer 49, a phase shifter 50, a mixer 51, and a direct current amplifier 52, while the coils 45 and 46 are connected to the same current source 48 through the phase shifter 50, a mixer 53 and a direct current amplifier 54. These connections are so made that the coils 43 and 44 are energized with 0° phase current, and the coils 45 and 46 are energized with 90° phase current. Therefore, when the current from the source 48 is applied to the coils, the mirror 29 moves in a circular nutating path to reflect the light rays delivered thereto by the focusing lens 28 as a circular nutating light beam.

It is evident that when this light beam is reflected by mirrors 33 and 34 as hereinbefore described it appears as a small disc of light 15′ nutating in a circular path about the aperture 38 of the diaphragm 37. Moreover the iris diaphragm 37 is so arranged that when it is in its second adjusted position the diameter of the aperture 38 is equal to the diameter of the light disc or flare image 15′. Furthermore, the current supplied to the scanning head 30 is such that when the flare 15 is aligned with the tracking line O—T, the mirror 29 nutates in such a manner that the center of the circular path of the nutating light disc is in coincidence with the center of the aperture 38.

In order to provide a relatively wide field of view about the optical axis or tracking line O—T and further to provide for a greater amplitude of nutation of the scanning head 30 whereby the initial location of the missile 13 is facilitated, the variable focal length lens 26, the diaphragm 37 and the potentiometer 49 are mechanically connected by a gear train 55 to a motor 56.

As shown in Fig. 2, gear train 55 comprises a driving gear 57 of the motor 56 that meshes with a gear 58 keyed or otherwise fixedly secured to a driven shaft 59 which, in turn, is mounted for rotation in conventional supporting means 60. A gear 61 mounted on one end of the shaft 59 for rotation therewith meshes with an external gear 62 carried by the iris diaphragm assembly 36. The gear 62 is operatively connected through conventional means with the diaphragm 37 of the iris assembly 36 to the end that its rotation in one direction increases the size of the aperture 38 of the diaphragm 37, while its rotation in the opposite direction decreases the size of the aperture 38. The gear 62 also operatively engages an external gear 63 of the variable focal length lens 26 which upon its rotation serves to vary the focal length, and hence the field of view, of the variable focal length lens 26. In addition to the foregoing elements, the gear train 55 also includes a gear 64 that is mounted on the driven shaft 59 for rotation therewith to mesh with a gear 65 of the potentiometer 49. Rotation of the gear 65 varies the resistance of the potentiometer 49.

The motor 56 is connected through a sensitive relay 66 to a source of alternating current 67. Actuation of the relay 66 is controlled by the photo-electric cell assembly 40 and to that end the photo-electric cell assembly 40 is connected through a direct current amplifier 68, a detector 69 and a relay driver 70 to the sensitive relay 66.

When the photo-electric cell assembly 40 "sees" no light, i.e., before the flare 15 enters the enlarged field of view, the detector 69 and the relay driver 70 actuate the sensitive relay 66 to operate the motor 56 in a direction whereby it drives the gear train 55 to adjust the variable focal length lens 26 to its widest field of view, the aperture 38 of diaphragm 37 to its greatest size and the potentiometer 49 to its corresponding highest voltage value. Since the potentiometer is set at its highest voltage value, a relatively large current is delivered to the scanning head 30 and the mirror 29 thereof nutates at a relatively high amplitude. It is manifest from the foregoing that prior to the launching of the missile 13, the scanning device 16 is set to scan a wide field of view.

When the flare 15 appears in the enlarged scanned field of view, the light rays therefrom will be directed as aforesaid to the photo-electric cell assembly 40. In response to the light rays, the photo-electric cell assembly 40 develops a voltage that is sensed by the detector 69 to cause the relay driver 70 to actuate the sensitive relay 66 so that the motor 56 is operated to drive the gear train 55 in the direction to reduce the field of view of the variable focal length lens 26, the size of the aperture 38 in the diaphragm 37 and to decrease the voltage from the potentiometer 49. Hence, as the scanned field of view narrows the current applied to the scanning head 30 is reduced to the end that the amplitude of nutation is also reduced.

Since the flare 15 usually comes into the enlarged scanned field of view from its periphery, the light disc 15′ will not be centered with respect to the aperture 38 in the diaphragm 37, but will be displaced either in azimuth or elevation or both with respect thereto, i.e., the center of the circular nutating path of the light disc 15′ will be displaced horizontally, vertically, or both horizontally and vertically from the center of the aperture 38.

Figures 4, 7, 8:
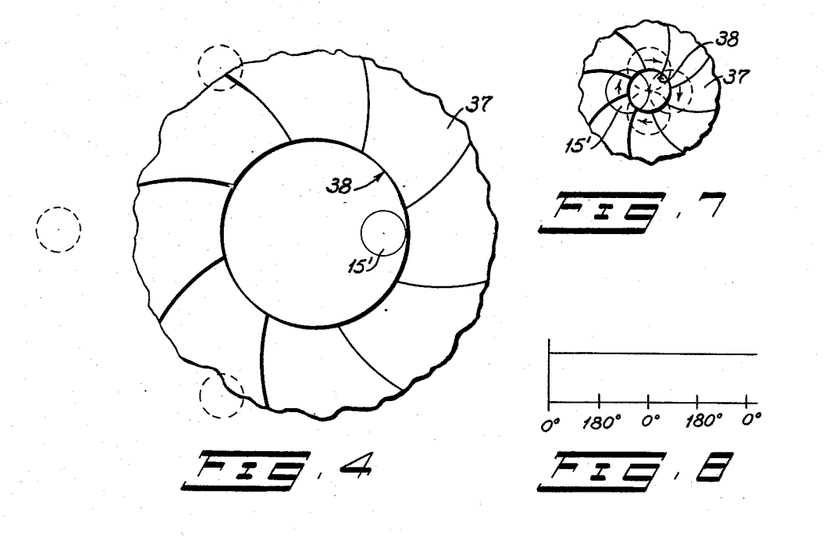
Fig. 4 is a view of the iris diaphragm of the instant device showing the image of a flare carried by the missile as it appears on the diaphragm during the coarse tracking operation of the instant device.
Fig. 7 is a fragmentary view similar to Fig. 5 but showing the image of the flare carried by the missile as it appears on the iris diaphragm when the missile is on course and the light rays delivered to the photo-electric cell.
Fig. 8 is a graph of the voltage output of the photo cell under conditions illustrated in Fig. 7.

Thus if the missile 13 is off course in a direction horizontally to the right of the tracking line O—T, i.e., in azimuth, the light disc will appear on the diaphragm 37 as shown in Fig. 4. As a result, the photo-electric cell assembly 40 "sees" a pulsating light having a frequency equal to the frequency of nutation of the scanning mirror 29 and develops a voltage the phase of which is proportional to the direction of displacement of the missile 13 from the optical axis O—T.

As shown in Fig. 3, the voltage output of the photo-electric cell assembly 40 is fed through an alternating current amplifier 71 and then is applied in parallel to azimuth and elevation demodulators 72 and 73, respectively. The azimuth and elevation demodulators 72 and 73 are identical phase sensitive, ring type configurations and are responsive only to the alternating current portion of the voltage developed by the photo-electric cell assembly 40. The demodulators 72 and 73 are connected to a suitable phase shifter 74 that is connected to a source of alternating current 75 of the same frequency as the source 48 whereby the azimuth demodulator 72 is supplied with a reference voltage at 0° phase and the elevation demodulator 73 with 90° phase reference voltage. Accordingly, in response to the alternating current delivered thereto by the amplifier 71, the two demodulators 72 and 73 generate direct current voltages proportional to the direction of displacement of the light disc 15′ in azimuth and elevation, respectively relative to the center of the aperture 38.

The direct current voltage output of the azimuth demodulator 72 is proportional to the directional error in azimuth between the position of the image of the flare or light disc 15′, on the diaphragm 37 with respect to the aperture 38, and its desired position where it nutates in a circular path about the center of the aperture, i.e., the center of the nutating path of the light disc 15′, is disposed to the right of the center of the aperture 38 but on its horizontal diameter as shown in Fig. 4 whereas in its desired position the centers of the nutating path of the light disc 15′ and the aperture 38 are coincident. The error voltage output of the azimuth demodulator 72 is fed into an electronic integrator 76, which integrates it with respect to time. In other words, the azimuth integrator 76 builds up a voltage proportional to the integral with respect to time of the input error voltages delivered thereto by the azimuth demodulator 72 and holds the delivered error voltage at its highest value. The output of the azimuth integrator 76 is fed through the mixer 53 to the direct current amplifier 54, which then serves to generate a direct current, that is imposed on the nutating current and biases the azimuth coils 45 and 46 of the scanning head 30 so that the mirror 29 is displaced or rotated about its vertical axis against the force of the spring 41. The displacement of the mirror 29 about its vertical axis is such that the center of the nutating light disc on the iris diaphragm 37 is moved relative to the center of the aperture 38 so as to align it therewith. As a result, the voltage developed by the photo-electric cell 40 is reduced to zero. When this occurs, there is no output from the phase sensitive azimuth demodulator 72 and the azimuth integrator 76 remains with whatever voltage was necessary to cause the error to go to zero. The voltage remaining on the azimuth indicator then is proportional to the displacement in azimuth of the missile 13 from the tracking line or optical axis O—T and is used as a signal that is transmitted through the computer 17 and transmitter 18 to the missile 13 where it operates the missile control or guidance system to move the missile in the direction of the line O—T.

Figure 5:
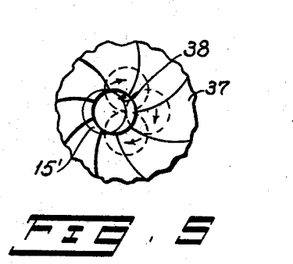
Fig. 5 is a fragmentary view of the iris diaphragm showing the image of the flare carried by the missile as it appears on the diaphragm during the accurate tracking operation of the instant device when the missile is off course in azimuth and the light rays delivered to a photo-electric cell of the instant device.
Figure 6:
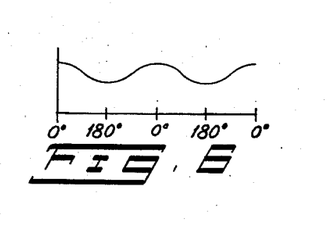
Fig. 6 is a graph of voltage output of the photo cell under conditions illustrated in Fig. 5.
Figure 9:
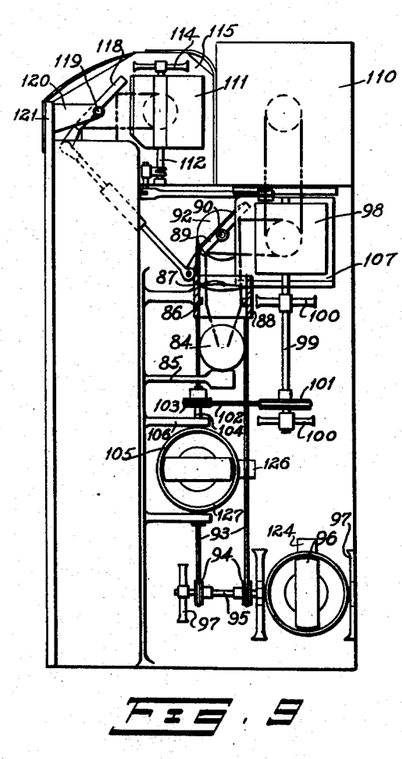
Fig. 9 is a view from the rear of the combined sighting and tracking device looking forward.
Figure 10:
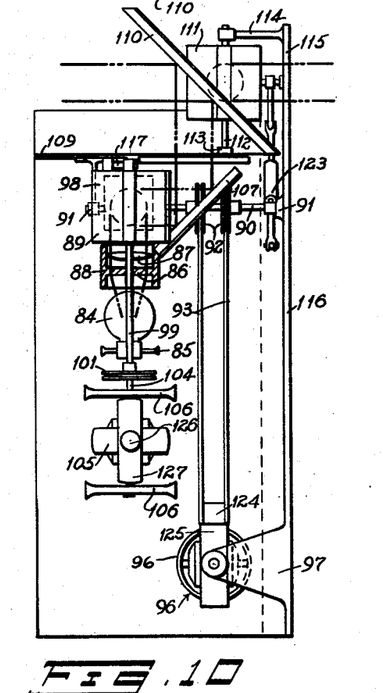
Fig. 10 is a side elevation of the combined tracking and sighting apparatus.
Figure 11:
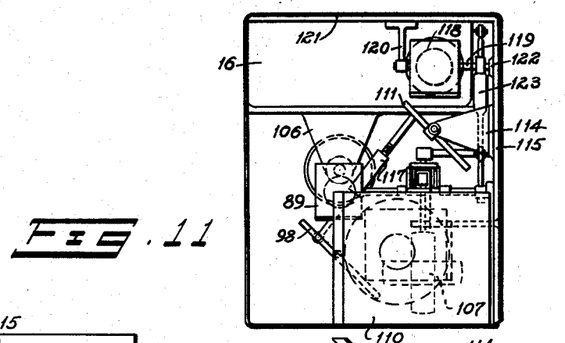
Fig. 11 is a plan view of this combined unit.

As the missile 13 moves in the direction of the tracking line O—T in response to these signals which are relatively coarse, the field of view established by the variable focal length lens 26, the size of the aperture 38 and the amplitude of nutation of the mirror 29 are being reduced simultaneously as described. Therefore, when the variable focal length lens 26 and the aperture 38 attain their second position the light disc 15' now appears on the diaphragm 37 as shown in Fig. 5. Under these conditions the device 16 is set for accurate tracking and the voltage output of the photo-electric cell assembly 40 is as shown in Fig. 6. Here, both the phase and amplitude of the voltage output of the photo-electric cell assembly 40 are proportional to the direction and magnitude of displacement, respectively of the center of the path of the nutating light disc 15' from the center of the aperture 38. After this voltage has been passed through the direct current amplifier 68, the alternating current amplifier 71, and the azimuth demodulator 72 to the azimuth integrator 76, the output voltage of the latter is directly proportional to direction and magnitude of displacement of the missile 13 from the tracking line O—T. The signal thus developed is transmitted as aforesaid to the missile 13 to correct its course.

In response to the signals above described, the missile 13 moves in the direction of the tracking line O—T. Therefore, light rays from the flare 15 are reflected by the scanning mirror 29 so that the light disc 15' appearing on the iris diaphragm 37 is now displaced to the left of the center of the aperture 38. In other words, the center of the nutating path of the light disc is displaced in the opposite direction from its original displacement as shown in Fig. 5 when the accurate tracking operation was achieved. As a result, the voltage developed by the photo-electric cell assembly 40 and delivered to the alternating current amplifier 71 is opposite in phase to the original voltage. Therefore, when this error voltage is applied to the azimuth integrator 76 through the azimuth demodulator 72 it decreases the voltage held by the integrator 76 and therefore reduces the biasing current imposed on the azimuth coils 45 and 46. In response to the decrease in the biasing current the mirror 29 is moved in a direction to realign the center of the path of the nutating light disc 15' with the center of the aperture 38. When this occurs, there is no output from the azimuth demodulator 72 and the azimuth integrator 76 remains with this new voltage that was required to cause the error to go to zero. The voltage now held by the azimuth integrator 76 is transmitted as hereinbefore set forth to the missile 13, where it serves to actuate the guidance system thereof to move the missile toward the tracking line O—T.

The foregoing accurate tracking operations of the tracking device 16 are repeated until the missile 13, and hence its flare 15, comes into alignment with the tracking line or optical axis O—T. At that time the center of the path of the nutating light disc 15' is aligned or in coincidence with the center of the aperture 38, as shown in Fig. 7. Therefore, the photo-electric cell 40 "sees" a constant light and produces a constant voltage such as is illustrated graphically in Fig. 8. Under these conditions the output of the azimuth integrator 76 does not produce a biasing current on the coils 45 and 46 and as a result there are no signals transmitted to the missile 13.

Both the coarse and accurate tracking operations of the azimuth channel just described are duplicated in the elevation channel. More particularly, the direct current voltage output of the elevation demodulator 73 is proportional to the error in elevation between the position of the center of the path of the nutating light disc or flare image 15' on the diaphragm 37 with respect to the center of the aperture 38 and its desired position where these centers are in coincidence. The error voltage developed by the elevation demodulator 73 is fed to an electronic elevation integrator 77 which integrates it with respect to time. The output of the elevation integrator 77 is fed through the mixer 51 to the direct current amplifier 52 which then generates the biasing current necessary to actuate the elevation coils 43 and 44 of the scanning head 30 to displace its mirror 29 about its horizontal axis so as to align the centers of the path of the nutating light disc and the aperture 38. When this occurs the voltage developed by the photo-electric cell assembly 40 is reduced to zero and there is no output from the phase sensitive elevation demodulator 73. Hence, the elevation integrator 77 remains with whatever voltage is necessary to cause the error to go to zero. The voltage remaining on the elevation integrator 77 is directly proportional to the deviation in elevation of the missile 13 from the tracking line or optical axis O—T and constitutes an error signal that is transmitted to the computer 17 and transmitter 18 to the missile 13, where it serves to operate the guidance system thereof to bring the missile to the tracking line O—T.

In the foregoing description of the operation of the tracking device 16, the azimuth and elevation channels have been treated independently. It is evident, however, that if the missile 13 is off course in both azimuth and elevation, both the azimuth and elevation channels will operate simultaneously, to indicate concurrently both errors in position.

To protect the photo-electric cell assembly 40 during the initial portion of the tracking operation by reducing the brightness of the light rays delivered thereto immediately after the launching of the missile 13 when it is relatively close to the aircraft, the photo-cell assembly 40 is provided with a conventional light attenuator or screen 78. The light attenuator 78 is mechanically connected through a gear train 79 with an electric motor 80 which, in turn, is connected through a locking relay 81 with an alternating current source 82. Through conventional means, not shown, the relay 81 receives a signal from the launching mechanism of the missile 13 and in response thereto is actuated to start the motor 80. The motor 80 drives the light attenuator as a function of time to compensate for the variation in intensity of the light rays from the missile flare 15 as its range increases from the tracking device 16.

The tracking device 16 hereinbefore set forth is used in association with a fixed reticle sight 10 of the aircraft and it is mounted or positioned in the aircraft in close proximity to the sight 10 in order that its optical axis or tracking line O—T and the line of sight S—T will be as close to parallel or coincidence as possible. Since the means for establishing both the line of sight S—T and the tracking line O—T are fixedly mounted in the aircraft, movements of the aircraft in pitch and yaw displace them with respect to the target. For example, pitch movements of the aircraft, i.e., movements about the horizontal axis of the aircraft normal to the line of flight, displace the line of sight S—T and the tracking line O—T in a vertical direction from the target 12. On the other hand, as a result of yaw movements of the aircraft, i.e., movements about the vertical axis of the aircraft normal to the direction of flight, the line of sight S—T and the tracking line O—T are displaced horizontally from the target 12.

In the combined version of the optical tracking device contemplated herein, sighting means for establishing the line of sight are added to the tracking device 16 and means are provided whereby pitch and yaw movements of the aircraft to not affect the operation of the combined device.

In general, the tracking device 16 is combined with means, including a system of mirrors, that are operatively connected to conventional pitch and yaw gyroscopes, which means serve to establish and stabilize the line of sight S—T, and to stabilize the tracking line O—T so that pitch and yaw movements of the aircraft during flight do not adversely affect the tracking of the missile. Moreover, suitable pilot controlled torque producing means are operatively associated with the pitch and yaw gyroscopes for precessing them in a preselected manner so that the aircraft may be flown in constant radius turns relative to the target 12, or at a constant bearing with respect thereto, without displacing the line of sight S—T or the tracking line O—T from the target 12.

As shown in Figs. 9 through 12, a casing 83 is added to one side of the casing 21 of the tracking device 16 which, in this instance, is mounted in a vertical position. To establish a line of sight S—T and stabilize it in pitch and yaw, a lamp 84 is mounted by a support 85 within the casing 83 and is connected to a conventional electrical circuit for illuminating the same. The lamp 84 is positioned so that the lamp rays are directed into and through a reticle 86 and a collimator lens 87 that are mounted within the casing 83 in a common frame 88. The reticle image thus formed is directed to a reticle pitch mirror 89 that is fixedly secured to one end of a shaft 90 for rotation therewith. The shaft 90 is rotatably mounted within the casing 83 in spaced support members 91 for rotation about a horizontal axis parallel to the fore and aft or longitudinal axis of the aircraft. A pair of spaced pulleys 92, keyed or otherwise secured to the shaft 90 for rotation therewith, are connected through cables 93 with a pair of spaced pulleys 94 that are fixedly mounted on a shaft 95 of a conventional pitch gyroscope 96. The shaft 95 and the pitch gyroscope 96 are mounted within the casing 83 by a suitable supporting frame 97, with the shaft 95 rotatable about the pitch axis of the pitch gyroscope 96. Furthermore, the relationship of the pulleys 92 to the pulleys 94 is two to one to the end that the reticle pitch mirror 89 is rotated through half the angle of the rotation of the shaft 95.

Figure 12:
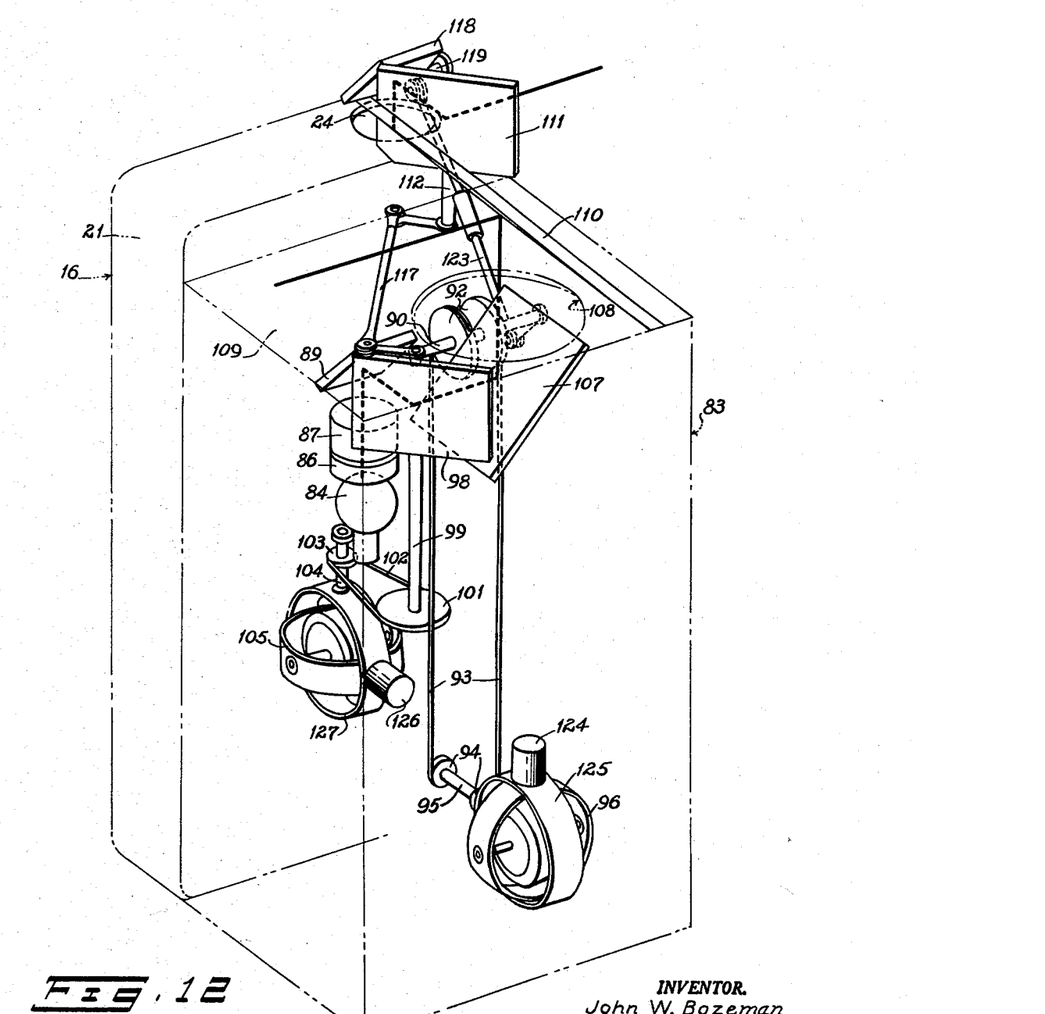
Fig. 12 is an isometric, schematic view of the combined unit shown in Figs. 8, 9 and 10 to more clearly illustrate its operation.

From the reticle pitch mirror 89, the reticle image is directed to a reticle yaw mirror 98. The reticle yaw mirror 98 is fixedly secured to one end of a shaft 99 which, in turn, is rotatably mounted within the casing 83 in a pair of spaced supports 100 for rotation about a vertical axis normal to the longitudinal axis of the aircraft. Adjacent its opposite end, the shaft 99 is provided with a pulley 101 that is connected by a belt 102 to a pulley 103 fixedly mounted on a shaft 104 of a conventional yaw gyroscope 105. The shaft 104 and the yaw gyroscope 105 are mounted within the casing 83 in spaced support means 106 for rotation about the yaw axis of the yaw gyroscope 105. The pulleys 101 and 103 are in two to one ratio to the end that the reticle yaw mirror 98 is rotated through one-half the angle of rotation of the shaft 104 of the yaw gyroscope 105.

From the reticle yaw mirror 98, the reticle image is directed to a folding mirror 107 that is mounted within the casing 83 by any suitable means, not shown. The folding mirror 107 serves to direct the reticle image through an opening 108 in the end wall 109 of the casing 83 and to a pilot's sight reflector 110 that is mounted by a support structure, not shown, to the outer side of the end wall 109. The pilot's sight reflector 110 serves as the sighting means whereby the line of sight S—T is established. The tracking device 16 is mounted within the aircraft in such a manner that the pilot may readily view the reticle image on the pilot's sight reflector 110 and to align the same with the target 12 by maneuvering the aircraft to establish the line of sight S—T. Thus, the pilot's sight reflector 110 serves in the same capacity as the fixed sighting means 10. In fact, when the pitch and yaw gyroscopes 96 and 105, respectively, are caged in their zero or referenced positions, the pilot's sight reflector 110 serves as a fixed sighting means. Therefore, the pilot establishes the line of sight S—T by maneuvering the aircraft to align the target 12 with the reticle image appearing on the pilot's sight reflector 110.

After the line of sight S—T has been established, the gyroscopes are uncaged. Thereafter, the positions of the reticle pitch mirror 89 and the reticle yaw mirror 98 are controlled by the pitch and yaw gyroscopes 96 and 105, respectively, in such manner that the pitch and yaw movements of the aircraft are cancelled out or nullified and the line of sight S—T is unaffected thereby.

The pitch and yaw gyroscopes 96 and 105 are also used to stabilize the tracking line O—T. To this end, a tracker yaw mirror 111 is secured to a shaft 112 which, in turn, is mounted for rotation in a support 113 secured to the outer surface of the end wall 109 and a support 114 carried by an extension 115 of the side wall 116 of the casing 83. The shaft 112 is mounted for rotation about an axis parallel to the shaft 99 and is connected thereto by a linkage 117. The linkage 117 is so constructed and arranged that the shaft 112 is rotated in the same direction and through the same angle of rotation as the shaft 99. In other words, through the linkage 117 the reticle yaw mirror 98 and the tracker yaw mirror 111 are moved simultaneously in the same direction and through the same angle of rotation by the yaw gyroscope 105.

A tracker pitch mirror 118 is secured to a shaft 119 for rotation therewith about an axis parallel to the shaft 90. The shaft 119 is rotatably mounted in a bracket 120 that is secured to an extension 121 of the side wall of the casing 21 of the tracking device and a support 122 carried by the extension 115. The shaft 119 is operatively connected through a linkage 123 with the shaft 90 of the reticle pitch mirror 89 so that the pitch gyroscope 96 controls the position of both of said mirrors. Thus, through the linkage 123, movements of the shaft 90, and hence the reticle pitch mirror 89 result in a corresponding movement of the shaft 119 and its associated tracker pitch mirror 118.

As hereinbefore set forth, the combined sighting and tracking device is mounted within the aircraft to permit the pilot to readily view the pilot's sight reflector 110 and to establish the line of sight S—T. In addition, it is so mounted that the tracker yaw mirror 111 is positioned to receive the light rays from the flare 15 of the missile 13. The tracker yaw mirror 111, in turn, is so positioned with respect to the tracker pitch mirror 118 and the latter is so positioned with respect to the filter 24 of the tracking device 16, that the light rays from the flare 15 are reflected from the tracker yaw mirror 111 to the tracker pitch mirror 118 and thence to and through the filter 24. The light rays from the flare 15 after passing through the window 24 operate the tracking device 16 as described.

Due to the foregoing organization and arrangement of parts, when the pitch and yaw gyroscopes 96 and 105, respectively, are caged and therefore in their normal or referenced positions, the reticle pitch mirror 89 and the reticle yaw mirror 98 as well as the tracker pitch mirror 118 and tracker yaw mirror 111 associated therewith, are also in their respective normal or referenced positions. Therefore, the reticle image reflected on the pilot's sight reflector 110 serves as a fixed sighting means to establish the line of sight S—T between the aircraft and the target 12. Additionally, the light rays from the missile's flare 15 are directed by the tracker yaw and pitch mirrors 111 and 118 into the tracking device 16. It is manifest that under these conditions the tracking device 16 operates in the same manner as the device 16 (shown in Fig. 1) operates when uncombined with the sighting device. Thus, the alignment of the reticle image on the pilot's sight reflector 110 with the target 12 serves to establish the line of sight S—T and concurrently establishes the tracking line O—T. When the pitch and yaw gyroscopes 96 and 105, respectively, are uncaged, however, they control the position of the reticle pitch and yaw mirrors 89 and 98 and the tracker pitch and yaw mirrors 118 and 111 in such a manner that pitch and yaw movements of the aircraft are cancelled out or nullified and the accurate tracking of the missile 13 is unaffected thereby.

As set forth, when the pitch and yaw gyroscopes 96 and 105 respectively, are uncaged, they control the reticle pitch and yaw mirrors 89 and 98 and the tracker pitch and yaw mirrors 118 and 111 to stabilize the sight line S—T and the tracking line O—T against the pitch and yaw movements of the aircraft. It then becomes possible to deliberately introduce pitch and yaw components into the flight path of the aircraft, thereby permitting the evasive maneuvering thereof while still maintaining an accurate control over the missile 13. To this end, torque producing means are associated with both the pitch and yaw gyroscopes 96 and 105 whereby a torque is generated which causes the gyroscopes to precess in a selected manner and at a selected rate.

As shown more specifically in Fig. 12, a conventional torque motor 124 is mounted on the gimbal frame 125 on the yaw axis of the pitch gyroscope 96. The torque motor 124 is connected with a conventional electrical circuit (not shown) and its operation is controlled by suitable means (not shown) available to the pilot in the aircraft's cockpit. Upon the energization of the torque motor 124 by the pilot in one direction, a torque is produced that is effective on the pitch gyroscope 96 to cause it to precess about its pitch axis in a first direction and at a rate determined by the torque applied by the torque motor 124 to its yaw axis. Conversely, in response to the energization of the torque motor 124 in the opposite direction, the pitch gyroscope 96 precesses in the opposite direction and at a rate proportional to the applied torque. Similarly the yaw gyroscope 105 is provided with a conventional torque motor 126 that is mounted on the gimbal frame 127 on the pitch axis of the yaw gyroscope 105. As in the instance of the torque motor 124, the torque motor 126 is connected with an electrical circuit (not shown) and is operated by suitable means available to the pilot. When torque motor 126 is energized in one direction a torque is produced which causes the yaw gyroscope 105 to precess in that direction about its yaw axis at a rate proportional to the torque applied to its pitch axis. On the other hand, when the torque motor 126 is energized in the opposite direction, the precession of the yaw gyroscope 105 also will be in the opposite direction and at a rate proportional to the applied torque.

Due to the foregoing arrangement, the pilot can control the operation of either or both of the torque motors 124 and 126 and thereby be enabled to execute a constant radius turn to either the right or left or may fly the aircraft at a constant offset bearing with respect to the target while maintaining the line of sight S—T and hence the tracking line O—T on the target. It is manifest, therefore, that the addition of the torque motors 124 and 126 to their respective gyroscopes 96 and 105 permits evasive movement of the aircraft without affecting the accurate tracking of the missile 13.

Since, with the exception of the scanning head 30, the components per se of the tracking device 16 or the combined sighting and tracking device, e.g. the lenses 26, 27 and 28, the iris diaphragm assembly 36, the photo-electric assembly cell 40 and the various amplifiers, demodulators, integrators and mixers, are conventional and readily obtainable on the open market, they have not been described in detail. Moreover, the present invention is not directed toward the construction and/or operation of these components per se but rather is directed toward combining these components in such a way that they cooperate with each other to produce an unexpected result heretofore unknown in the art.

What is claimed is:

1. A tracking device for tracking and indicating the position of an object having a light source, said device comprising a closed casing, a filter window in said casing to selectively pass light rays from the light source into said casing, a variable focal length lens positioned in said casing in optical axial alignment with said filter window to receive the light rays passing therethrough and to focus them at an image plane, said variable focal length lens having means for adjusting its focal length between a first focal length providing a wide field of view with low unit magnification and a second position providing a narrow field of view with high unit magnification, a collimating lens mounted in said casing in optical axial alignment with said variable focal length lens whereby the image is inverted leaving the light rays parallel, a focusing lens positioned in said casing in optical axial alignment with said collimating lens to receive the light rays therefrom, a scanning head mounted in said casing and having a scanning mirror in optical axial alignment with said focusing lens, said variable focal length, collimating and focusing lenses and said scanning mirror establishing an optical axis for the device that is centered with respect to the field of view determined by said variable focal length lens, electrical operating means in said scanning head constructed and arranged to circularly nutate said scanning mirror, means for applying a current to said electrical operating means to operate the same, said means including a potentiometer and means for adjusting the voltage output thereof between a first position of high voltage output and a second position of low voltage output to vary the current delivered to said electrical operating means and thereby vary the amplitude of nutation of said scanning mirror, a first mirror positioned in said casing to receive and reflect the nutating light rays from said scanning mirror, a second mirror positioned in said casing to receive and reflect the nutating light rays from said first mirror, an iris diaphragm having a variable aperture, means for adjusting the size of said aperture, said focusing lens focusing the light rays whereby they appear on said diaphragm as a disc of light nutating in a circular path about the aperture of said diaphragm after reflection by said mirrors, a collector lens positioned in said casing to receive the light rays passed through said aperture, a photo-electric cell assembly positioned in said casing to receive the light rays from said collector lens and being responsive thereto to develop a voltage having a phase and amplitude proportional to the direction and magnitude of displacement of the center of the circular path of the nutating light disc from the center of said aperture, means connected to said photo-electric cell assembly and responsive to the voltage developed thereby to generate a biasing current, said means connected to the electrical operating means whereby the biasing current is imposed on the current applied to the electrical operating means to move said scanning mirror to align the centers of the path of the nutating light disc and said aperture, said biasing current being proportional to the direction and magnitude of displacement of said light source relative to the optical axis, means interconnecting the adjusting means of said variable focal length lens, said aperture and said potentiometer, and means for operating said interconnecting means, said operating means effective when no voltage is being developed by said photo-electric cell assembly to operate said interconnecting means and the adjusting means connected thereto to adjust said variable focal length lens, said aperture and potentiometer to their first positions and upon receiving a voltage from said photo-electric cell assembly to operate said interconnecting means and the adjusting means connected thereto to adjust said variable focal length lens, said aperture and said potentiometer to their second positions.

2. In a tracking device for tracking an optically perceptible object, the combination comprising a closed casing, a filter window in said casing to selectively pass light rays from the tracked object into said casing, a variable focal length lens positioned in said casing in optical axial alignment with said filter window to receive the light rays passing therethrough and to focus them at an image plane, said variable focal length lens having means for adjusting its focal length between a first focal length providing a wide field of view and a second position providing a narrow field of view, a collimating lens mounted in said casing in optical axial alignment with said variable focal length lens whereby the image is inverted leaving the light rays parallel, a focusing lens positioned within said casing in optical axial alignment with said collimating lens to receive the light rays therefrom, a scanning head mounted in said casing and having a scanning mirror in optical alignment with said focusing lens to receive the light rays therefrom, electrical operating means in said scanning head responsive to an applied current to nutate said scanning mirror whereby the light rays reflected therefrom are nutated in a circular path, means for applying a current to said electrical operating means including a potentiometer having means for varying its voltage output to control the amplitude of nutation of said scanning mirror, a first mirror positioned in said casing to receive the nutating light rays reflected by said scanning mirror, a second mirror positioned in said casing to receive the nutating light rays from said first mirror, an iris diaphragm positioned within said casing to receive the nutating light rays from said second mirror, said iris diaphragm having an aperture and means for varying the size of said aperture, said focusing lens focusing the light rays whereby they appear on said iris diaphragm as a disc of light nutating in a circular path about the aperture of the diaphragm after reflection by said mirrors, a collector lens positioned in said casing to receive the light rays passed through said diaphragm aperture, a photo-electric cell assembly positioned in said casing to receive the light rays from said collector lens, said photo-electric cell assembly being responsive to the light rays received from said collector lens to develop a voltage the phase and amplitude of which is proportional to the direction and magnitude of displacement of the center of the circular path of the nutating light disc from the center of the aperture in the iris diaphragm, means connecting said photo-electric cell assembly to the electrical operating means of the scanning head whereby the voltage output of said photo-electric cell is imposed on said electrical operating means to cause it to move said scanning mirror in a direction to align the centers of the nutating light disc and said aperture in said iris diaphragm, means interconnecting the means for adjusting the focal length of said variable focal length lens, the size of said aperture and the voltage output of said potentiometer, and means responsive to the actuation of said photo-electric cell assembly for operating said interconnecting means to adjust said variable focal length lens to its second focal length, to reduce the size of the aperture of said iris diaphragm and decrease the voltage output of said potentiometer.

3. In a tracking device for tracking an optically perceptible object, the combination comprising a closed casing, a filter window in said casing to selectively pass light rays from the tracked object into said casing, a lens system positioned in said casing in optical axial alignment with said filter window to receive the light rays passing therethrough, a scanning head mounted in said casing and having a scanning mirror in optical alignment with said lens system to receive the light rays therefrom, electrical operating means in said scanning head responsive to an applied current to nutate said scanning mirror and thereby nutate the light rays reflected therefrom, means for applying a current to said electrical operating means, reflecting means positioned in said casing to receive the nutating light rays reflected by said scanning mirror, an iris diaphragm positioned within said casing to receive the nutating light rays from said reflecting, said iris diaphragm having an aperture, said lens system focusing the light rays whereby they appear on said iris diaphragm after reflection by said scanning mirror and reflecting means as a disc of light nutating in a circular path about the center of the aperture in said iris diaphragm, a collector lens positioned in said casing to receive the light rays passed through said aperture, a photoelectric cell assembly positioned in said casing to receive the light rays from said collector lens and responsive to the light rays received from said collector lens to develop a voltage the phase and amplitude of which is proportional to the direction and magnitude of displacement of the center of the circular path of the nutating light disc from the center of said aperture, and means connecting said photoelectric cell assembly to said electrical operating means whereby the voltage output of said photo-electric cell assembly is imposed on said electrical operating means so as to cause said scanning mirror to move in a direction to center the nutating light disc with respect to the center of said aperture.

4. In a tracking device for tracking an optically perceptible object, the combination comprising a closed casing, a filter window in said casing to selectively pass light rays from the tracked object into said casing, a lens system positioned in said casing in optical axial alignment with said filter window to receive the light rays passing therethrough, a scanning head mounted in said casing and having a scanning mirror in optical alignment with said lens system to receive the light rays therefrom, electrical operating means in said scanning head to nutate said scanning mirror, means connected to said electrical operating means for operating the same, said means including a potentiometer having means for varying its voltage output to control the frequency of nutation of said scanning mirror, reflecting means positioned in said casing to receive the nutating light rays reflected from said scanning mirror, an iris diaphragm postioned within said casing to receive the nutating light rays from said reflecting means, said iris diaphragm having an aperture and means for adjusting the size of said aperture, said lens system focusing the light rays whereby they appear on said iris diaphragm as a disc of light nutating in a circular path about the aperture in said iris diaphragm after reflection by said scanning mirror and reflecting means, a collector lens positioned in said casing to receive the light rays passed through said aperture, a photoelectric cell assembly positioned in said casing to receive the light rays from said collector lens and being responsive thereto to develop a voltage the phase and amplitude of which is proportional to the direction and magnitude of displacement of the center of the circular path of the nutating light disc from the center of the aperture in the iris diaphragm, means connecting said photo-electric cell assembly to said means for operating said electrical operating means whereby the voltage output of said photoelectric cell assembly is converted into a biasing current that is imposed on said electrical operating means so as to cause said scanning mirror to move in a direction to align the center of the nutating light disc with respect to the center of said aperture in said iris diaphragm, means interconnecting the adjusting means of said aperture and said variable resistor, and means responsive to the actuation of said photoelectric cell assembly for operating said interconnected means whereby the size of said aperture and the resistance of said resistor is adjusted.

5. In a tracking device for tracking an optically perceptive object, the combination comprising a closed casing, filter means for selectively passing light rays from the tracked object into said casing, a lens system positioned in said casing to receive the light rays passing through said filter means, a scanning mirror mounted in said casing to receive the light rays from said lens system, electrical operating means for nutating said scanning mirror, said electrical operating means including a potentiometer having means for varying its voltage output to thereby control the amplitude of nutation of said scanning mirror, reflecting means positioned in said casing to receive the nutating light rays reflected by said scanning mirror, an iris diaphragm positioned within said casing to receive the nutating light rays from said reflecting means, said iris diaphragm having an aperture and means for adjusting the size of said aperture, said lens system focusing the light rays whereby they appear on said diaphragm as a disc of light nutating in a circular path about its aperture after reflection by said scanning mirror and reflecting means, light ray collecting means positioned in said casing to receive the light rays passed through said aperture, a photoelectric cell assembly positioned in said casing to receive the light rays from said light ray collecting means and being responsive thereto to develop a voltage the phase and amplitude of which is proportional to the direction and magnitude of displacement of the center of the circular path of the nutating light disc from the center of the aperture in the iris diaphragm, means connected between said photo-electric cell assembly and said electrical operating means whereby the voltage output of said photo-electric cell assembly is imposed on said electrical operating means to cause said scanning mirror to move in a direction to center the nutating light disc with respect to the center of said aperture, means interconnecting the adjusting means of said aperture and said potentiometer, and means responsive to the actuation of said photo-electric cell assembly for operating said interconnected means whereby the size of said aperture and the voltage output of said potentiometer is adjusted.

6. In a tracking device for tracking an optically perceptible object, the combination comprising a closed casing, a filter window in said casing to selectively pass light rays from the tracked object into said casing, a lens system positioned in said casing in optical axial alignment with said filter window to receive the light rays passing therethrough, a scanning mirror mounted in said casing in optical alignment with said lens system to receive the light rays therefrom, electrical operating means associated with said scanning mirror and responsive to an applied current to nutate said scanning mirror, means for applying a current to said electrical operating means, said means including a potentiometer having means for varying its voltage output to thereby control the amplitude of nutation of said scanning mirror, a first mirror positioned in said casing to receive the nutating light rays reflected by said scanning mirror, a second mirror positioned in said casing to receive the nutating light rays from said first mirror, an iris diaphragm positioned within said casing to receive the nutating light rays from said second mirror, said iris diaphragm having an aperture and means for varying the size of said aperture, said lens system focusing the light rays whereby they appear on said iris diaphragm as a disc of light nutating in a circular path about the aperture in said iris diaphragm after their reflection by said scanning and said first and second mirrors, a collector lens positioned in said casing to receive the light rays passed through said aperture, a photo-electric cell assembly positioned in said casing to receive the light rays from said collector lens, said photo-electric cell assembly being responsive to the light rays received from said collector lens to develop a voltage the phase and amplitude of which is proportional to the direction and magnitude of displacement of the center of the circular path of the nutating light disc from the center of the aperture in the iris diaphragm, means connecting said photo-electric cell assembly to said means for nutating said scanning mirror whereby the voltage output of said photo-electric cell assembly is imposed thereon to cause said scanning mirror to move in a direction to center the nutating light disc with respect to the center of said aperture in said iris diaphragm, means for adjusting the voltage output of said potentiometer, and means responsive to the actuation of said photo-electric cell assembly for operating said potentiometer adjusting means to decrease the voltage output thereof.

7. In a tracking device for tracking an optically perceptible object, the combination comprising a closed casing, a filter window in said casing to selectively pass light rays from the tracked object into said casing, a lens system positioned in said casing in optical axial alignment with said filter window to receive the light rays passing therethrough, a scanning mirror mounted in said casing in optical alignment with said lens system to receive the light rays therefrom, electrical operating means associated with said scanning mirror and responsive to an applied current to nutate said scanning mirror and thereby nutate the light rays reflected therefrom, means connected to said electrical operating means to apply a current thereto, a first mirror positioned in said casing to receive the nutating light rays reflected by said scanning mirror, a second mirror positioned in said casing to receive the nutating light rays from said first mirror, an iris diaphragm positioned within said casing to receive the nutating light rays from said second mirror, said iris diaphragm having an aperture, said lens system focusing the light rays whereby they appear on said iris diaphragm as a disc of light nutating in a circular path about the aperture in said iris diaphragm after reflection by said scanning and said first and second mirrors, a collector lens positioned in said casing to receive the light rays passed through said aperture, a photo-electric cell assembly positioned in said casing to receive the light rays from said collector lens, said photo-electric cell assembly being responsive to the light rays received from said collector lens to develop a voltage the phase and amplitude of which is proportional to the direction and magnitude of displacement of the center of the circular path of the nutating light disc from the center of the aperture in the iris diaphragm, and means connecting said photo-electric cell assembly to said electrical operating means whereby the voltage output of said photo-electric cell assembly is imposed on said electrical operating means to cause said scanning mirror to move in a direction to center the nutating light disc with respect to the center of said aperture in said iris diaphragm.

8. In a tracking device for tracking an optically perceptible object, the combination comprising a closed casing, filter means in said casing to selectively pass light rays from the object into said casing, a lens system positioned in said casing to receive the light rays from said filter means, a scanning mirror mounted in said casing to receive the light rays from said lens system, electrical operating means for nutating said scanning mirror to thereby nutate the light rays reflected therefrom, reflecting means positioned in said casing to receive the nutating light rays reflected by said scanning mirror, an iris diaphragm positioned within said casing to receive the nutating light rays from said reflecting means, said iris diaphragm having an aperture, said lens system focusing the light rays after their reflection by said scanning mirror and reflecting means whereby they appear on said diaphragm as a disc of light nutating in a circular path about its aperture, light ray collecting means positioned in said casing to receive the light rays passed through said aperture, a photo-electric cell assembly positioned in said casing to receive the light rays from said light ray collecting means and responsive thereto to develop a voltage the phase and amplitude of which is proportional to the direction and magnitude of displacement of the center of the circular path of the nutating light disc from the center of said aperture, and means connected between said photo-electric cell assembly and said electrical operating means whereby the voltage output of said photo-electric cell assembly is converted into a current and is imposed on said electrical operating means so as to move said scanning mirror to center the nutating light disc with respect to the center of said aperture.

9. In a tracking device for tracking an optically perceptible object, the combination comprising a closed casing, filter means in said casing to selectively pass light rays from the tracked object into said casing, a lens system positioned in said casing to receive the light rays from said filter means, a scanning mirror mounted in said casing to receive the light rays from said lens system, electrical operating means for circularly nutating said scanning mirror to thereby nutate the light rays reflected therefrom, reflecting means positioned in said casing to receive and reflect the nutating light rays reflected from said scanning mirror, an iris diaphragm positioned within said casing to receive the nutating light rays from said reflecting means, said iris diaphragm having an aperture, said lens system focusing the light rays whereby they appear on said diaphragm as a disc of light nutating in a circular path about its aperture after reflection by said scanning mirror and reflecting means, light ray collecting means positioned in said casing to receive the light rays passed through said aperture, a photo-electric cell assembly positioned in said casing to receive the light rays from said light ray collecting means and being responsive thereto to develop a voltage the phase and amplitude of which is proportional to the direction and magnitude of displacement of the center of the circular path of the nutating light disc from the center of said aperture, and electronic means connected between said photo-electric cell assembly and said electrical operating means, said electronic means responsive to the output of said photo-electric cell assembly to generate a voltage that is imposed on said electrical operating means to move said scanning mirror to align the centers of the path of the nutating light disc and said aperture.

10. A combination sighting and tracking device for use in aircraft to aim and track a missile launched from the aircraft, said device comprising optical means for establishing a line of sight along the line of flight of the aircraft, means for establishing a tracking line in relatively close parallel relationship to the line of sight, means for optically scanning a field of view about the tracking line, means responsive to light rays received from the missile to indicate its position with respect to the tracking line, and means operatively connected to both the means for establishing the line of sight and the means for establishing the tracking line to rotate the line of sight and the tracking line and thereby cancel out yaw and pitch movements of the aircraft.

11. A combination sighting and tracking device for use in aircraft to aim and track a missile launched from the aircraft, said device comprising means for establishing a line of sight along the line of flight of the aircraft, means for establishing a tracking line in close parallel relationship to the lines of sight, means for optically scanning selected fields of view about the tracking line, means responsive to light rays received from the missile to indicate its position with respect to the tracking line and to vary the selected field of view of said optical scanning means, means for rotating the line of sight and the tracking line to cancel out yaw and pitch movements of the aircraft, and pilot-controlled means for selectively controlling the operation of said means for rotating the line of sight and tracking line.

12. A combination sighting and tracking device for use in aircraft to aim and track a missile launched from the aircraft, said device comprising means for establishing a line of sight, yaw and pitch gyroscopes operatively associated with said means for establishing the line of sight whereby yaw and pitch movements of the aircraft are cancelled out and the line of sight remains unaffected thereby, means for establishing a tracking line in close parallel relationship to said line of sight, a linkage operatively connecting said means for establishing the line of sight with said means for establishing the tracking line whereby the latter is unaffected by yaw and pitch movements of the aircraft, pilot-controlled means associated with said yaw and pitch gyroscopes for selectively precessing the same to thereby selectively rotate the line of sight and tracking line, and means for optically scanning a field of view about the tracking line and for indicating the position of the missile relative thereto.

13. In a tracking device for tracking an optically perceptible object, the combination comprising a casing, means to selectively pass light rays from the tracked object into said casing, focusing means positioned in said casing to receive the light rays from said light passing means, first reflecting means mounted in said casing to receive the light rays from said focusing means, electrical operating means for circularly nutating said first reflecting means to thereby nutate the light rays reflected therefrom, second reflecting means positioned in said casing to receive and reflect the nutating light rays reflected from said first reflecting means, an apertured diaphragm positioned within said casing to receive the nutating light rays from said second reflecting means, said focusing means focusing the light rays whereby they appear on said diaphragm as a disc of light nutating in a circular path about its aperture after reflection by said first and second reflecting means, light ray-collecting means positioned in said casing to receive the light rays passed through said aperture, voltage-generating means positioned in said casing to receive the light rays from said light ray-collecting means and responsive thereto to develop a voltage the phase and amplitude of which is proportional to the direction and magnitude of displacement of the center of the circular path of the nutating light disc from the center of said aperture, and electronic means connected between said voltage-generating means and said electrical operating means, said electronic means responsive to the output of said voltage-generating means to generate a voltage that is imposed on said electrical operating means to move said first reflecting means to align the centers of the path of the nutating light disc and said aperture.

14. In a tracking device for tracking an optically perceptible object, the combination comprising a closed casing, filter means in said casing to selectively pass light rays from the tracked object into said casing, focusing means positioned in said casing to receive the light rays from said filter means, reflecting means mounted in said casing to receive the light rays from said focusing means, electrical operating means for circularly nutating said reflecting means to thereby nutate the light rays reflected therefrom, an apertured diaphragm positioned within said casing to receive the light rays from said reflecting means, said focusing means focusing the light rays whereby they appear on said diaphragm as a disc of light nutating in a circular path about its aperture after reflection by said reflecting means, voltage-generating means positioned in said casing to receive the light rays from reflecting means and responsive thereto to develop a voltage the phase and amplitude of which is proportional to the direction and magnitude of displacement of the center of the circular path of the nutating light disc from the center of the aperture in said diaphragm, and electronic means connected between said voltage-generating means and said electrical operating means, said electronic means responsive to the output of said voltage-generating means to generate a voltage that is imposed on said electrical operating means to move said reflecting means to align the centers of the path of the nutating light disc and the aperture in said diaphragm.

15. In a tracking device for tracking an optically perceptible object, the combination comprising a closed casing, light-selecting means to selectively pass light rays from the tracked object into said casing, focusing means positioned in said casing to receive the light rays from said selecting means, a first reflecting means mounted in said casing to receive the light rays from said focusing means, electrical operating means for circularly nutating said first reflecting means to thereby nutate the light rays reflected therefrom, second reflecting means positioned in said casing to receive and reflect the nutating light rays reflected from said first reflecting means, an apertured diaphragm positioned within said casing to receive the nutating light rays from said second reflecting means, said focusing means focusing the light rays whereby they appear on said diaphragm as a disc of light nutating in a circular path about its aperture after reflection by said first and second reflecting means, and voltage-generating means positioned in said casing to receive the light rays passed through the aperture of said diaphragm and responsive thereto to develop a voltage the phase and amplitude of which is proportional to the direction and magnitude of displacement of the center of the circular path of the nutating light disc from the center of the aperture in said diaphragm.

16. In a tracking device for tracking an optically perceptible object, the combination comprising a casing, means for selectively passing light rays from the tracked object into said casing, an apertured diaphragm in said casing, means in said casing to receive the light rays passed through said light-selecting means and to focus and nutate the same whereby they appear on said diaphragm as a disc of light nutating in a circular path about the aperture therein, voltage-generating means positioned in said casing to receive the light rays passing through the aperture in said diaphragm and responsive thereto to develop a voltage the phase and amplitude of which is proportional to the direction and magnitude of displacement of the center path of the light disc from the center of the aperture in said diaphragm, and means responsive to the output of said voltage-generating means to adjust said focusing and nutating means to align the centers of the path of the light disc and the aperture in said diaphragm, and means for varying the size of the aperture in said diaphragm.

17. In a tracking device for tracking an optically perceptible object, the combination comprising a casing, means for selectively passing light rays from the tracked object into said casing, an apertured diaphragm in said casing, means in said casing to receive the light rays passed through said light-selecting means and to focus and nutate the same whereby they appear on said diaphragm as a disc of light nutating in a circular path about the aperture therein, and voltage-generating means positioned in said casing to receive the light rays passing through the aperture in said diaphragm and responsive thereto to develop a voltage the phase and amplitude of which is proportional to the direction and magnitude of displacement of the center path of the light disc from the center of the aperture in said diaphragm.

18. A combination sighting and tracking device for use in aircraft to aim and track a missile launched therefrom, said device comprising sighting means including a reflector and means to project a rectile image on said reflector to thereby establish a line of sight, tracking means including optical means constructed and arranged to scan selected fields of view about its optical axis and to receive light rays from the missile, means associated with said optical means to vary the field of view scanned thereby and means responsive to the light rays received by said optical means to indicate the position of the missile relative to the optical axis of said optical means, and stabilizing means connected to said reticle image projecting means and to said optical means to cancel out yaw and pitch movements of the aircraft.

19. A combination sighting and tracking device for use in aircraft to aim and track a missile launched therefrom, said device comprising sighting means including a reflector and means to project a rectile image on said reflector to thereby establish a line of sight, tracking means including nutating optical means constructed and arranged to scan selected fields of view about its optical axis and to receive light rays from the missile, means associated with said optical means to vary the rate of nutation and the field of view scanned thereby and means responsive to the light rays received by said optical means to indicate the position of the missile relative to the optical axis of said optical means, and stabilizing means connected to said reticle image projecting means and said optical means to cancel out yaw and pitch movements of the aircraft.

References Cited in the file of this patent

UNITED STATES PATENTS

| Number | Name | Date |
|---|---|---|
| 2,417,086 | Proskauer et al. | Mar. 11, 1947 |
| 2,418,137 | Noell | Apr. 1, 1947 |
| 2,421,012 | Chew | May 27, 1947 |
| 2,421,085 | Rylasky | May 27, 1947 |
| 2,463,362 | Doll | Mar. 1, 1949 |
| 2,482,699 | Vickers | Sept. 20, 1949 |
| 2,513,367 | Scott | July 4, 1950 |
| 2,600,662 | Kurlander | June 17, 1952 |
| 2,607,916 | Albersheim | Aug. 19, 1952 |
| 2,713,134 | Eckweiler | July 12, 1955 |
| 2,752,684 | Bentley | July 3, 1956 |